(12) United States Patent
Deng et al.

(10) Patent No.: US 7,907,361 B2
(45) Date of Patent: Mar. 15, 2011

(54) TRIPLE TRACK TEST FOR SIDE ERASE BAND WIDTH AND SIDE ERASE AMPLITUDE LOSS OF A RECORDING HEAD

(75) Inventors: Youping Deng, Saratoga, CA (US); Mike X. Wang, San Jose, CA (US); Jing Zhang, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 229 days.

(21) Appl. No.: 12/183,632

(22) Filed: Jul. 31, 2008

(65) Prior Publication Data

US 2010/0027148 A1    Feb. 4, 2010

(51) Int. Cl.
*G11B 27/36* (2006.01)

(52) U.S. Cl. .............................. 360/31; 360/60; 360/75

(58) Field of Classification Search .................. None
See application file for complete search history.

(56) References Cited

U.S. PATENT DOCUMENTS

| | | | |
|---|---|---|---|
| 6,061,195 A | 5/2000 | Wilson et al. | |
| 6,166,536 A | 12/2000 | Chen et al. | |
| 6,260,257 B1 | 7/2001 | Emo et al. | |
| 6,265,868 B1 | 7/2001 | Richter | |
| 6,680,609 B1 | 1/2004 | Fang et al. | |
| 6,842,304 B2 | 1/2005 | Chliwnyj et al. | |
| 7,023,204 B2 | 4/2006 | Nikitin et al. | |
| 7,119,537 B2 | 10/2006 | Che et al. | |
| 7,529,050 B2 * | 5/2009 | Shen et al. | 360/31 |
| 2003/0081338 A1 * | 5/2003 | Wang et al. | 360/66 |
| 2009/0195902 A1 * | 8/2009 | Moser et al. | 360/31 |

FOREIGN PATENT DOCUMENTS

JP    2005209274    8/2005

OTHER PUBLICATIONS

Lin, et al., "Effect of Media Properties on Side Erase Bands", *IEEE Transactions on Magnetics*, vol. 26, Issue 1 (Abstract Only), (Jan. 1990),132-134.
Mei, et al., "Coercivity and Frequency Dependence of track Widths and Erase Bands in Thin Film Media", *IEEE Transactions on Magnetics*, vol. 34, Issue 4 (Abstract Only), (Jul. 1998),1546-1548.

* cited by examiner

*Primary Examiner* — Jason C Olson (57) ABSTRACT

A triple track test for determining respective erase band widths associated with a read/write head involves writing first and second data tracks in each direction and at a certain distance from an origin, and erasing a track having a center at the origin. Based on a triple track test profile (3T) corresponding to the three tracks, a first distance is measured in one direction from the origin to one of the modified data tracks and a first erase band width is computed based thereon. The other side erase band width is computable similarly. A side erase amplitude loss measurement procedure, for determining the amount of signal amplitude lost by an adjacent track due to the respective erase bands, involves constructing a side-erase profile based on a composite of the 3T profile and a full-track profile, from which respective amplitude losses are computed for the respective erase bands.

17 Claims, 10 Drawing Sheets

PRIOR ART

FIG. 3A

PRIOR ART

FIG. 3B

PRIOR ART

TRIPLE TRACK TEST FOR SIDE ERASE BAND WIDTH AND SIDE ERASE AMPLITUDE LOSS OF A RECORDING HEAD

TECHNICAL FIELD

Embodiments of the invention relate generally to the field of hard disk drives and, more specifically, to a triple track test for determining side erase band widths and side erase amplitude loss of a recording head.

BACKGROUND ART

Electronic computing devices have become increasingly important to data computation, analysis and storage in our modern society. Modem direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is typically measured as the product of bits per inch ("BPI") and tracks per inch ("TPI"). BPI refers to the number of bits that can be written and later reread per linear inch along a track, whereas TPI refers to the number of individual tracks per radial inch. Improvements in areal density in turn lead to higher demands and stricter requirements put on the corresponding magnetic read/write heads. Furthermore, additional and significant improvements are taking place which fundamentally change how HDDs record data onto the media, such as with perpendicular magnetic recording (PMR) and thermally assisted recording (TAR).

When a recording ("write") element of a read/write head writes data to a magnetic disk media, non-magnetized areas are left along both sides of the data track, within the boundaries of the track. This non-magnetized area between the data tracks is referred to as "erase band." Erase band width is an important performance parameter for determining the track density of a head, especially in view of the improvements in areal density which result in very narrow data tracks. Additionally, erase band also affects the HDD servo design and performance. Therefore, it is important to characterize and minimize the erase band of a read/write head in HDD development and to measure the erase band quickly and accurately in head production.

Triple Track Testing

Figure 3A:
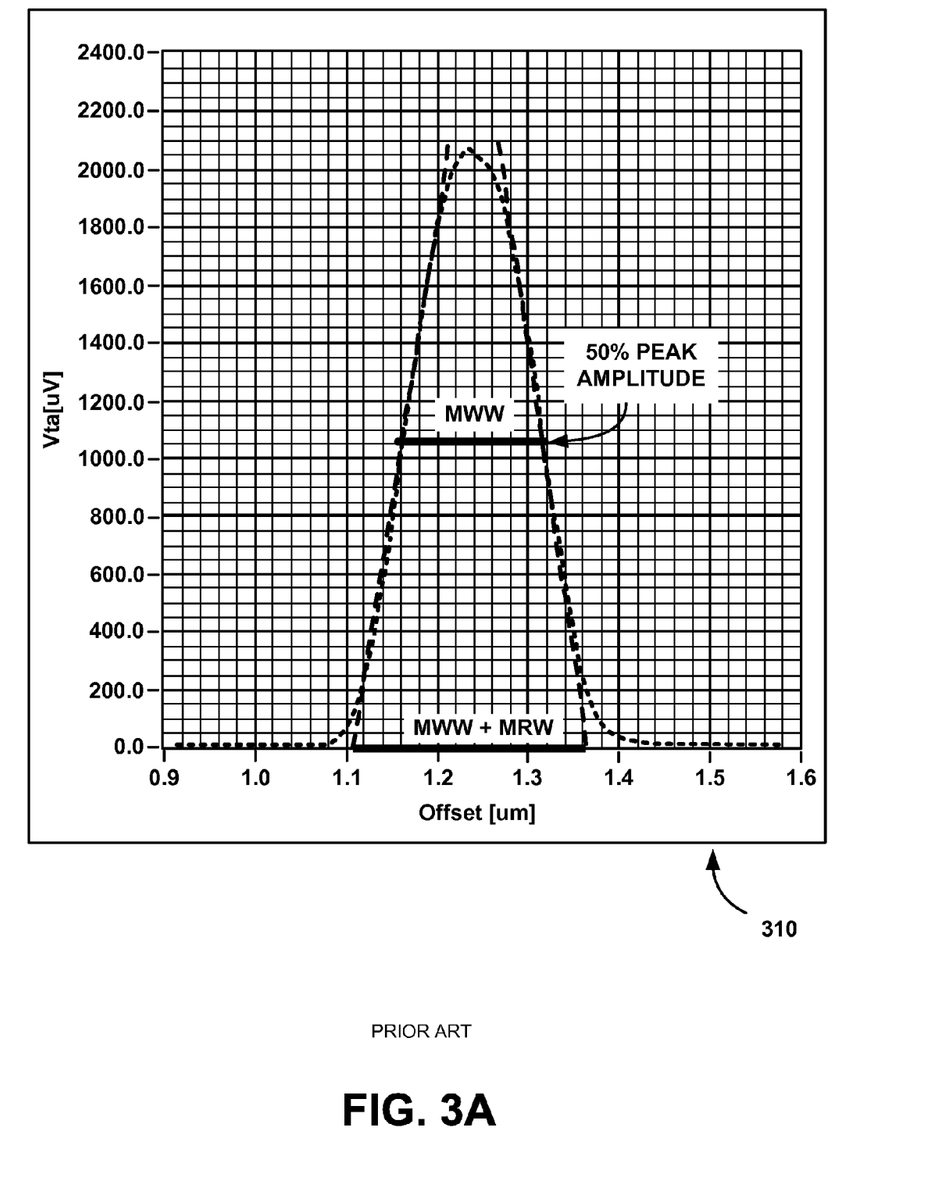
FIG. 3A is a graph illustrating a full-track profile according to a typical triple-track test (3T) procedure.
Figure 3B:
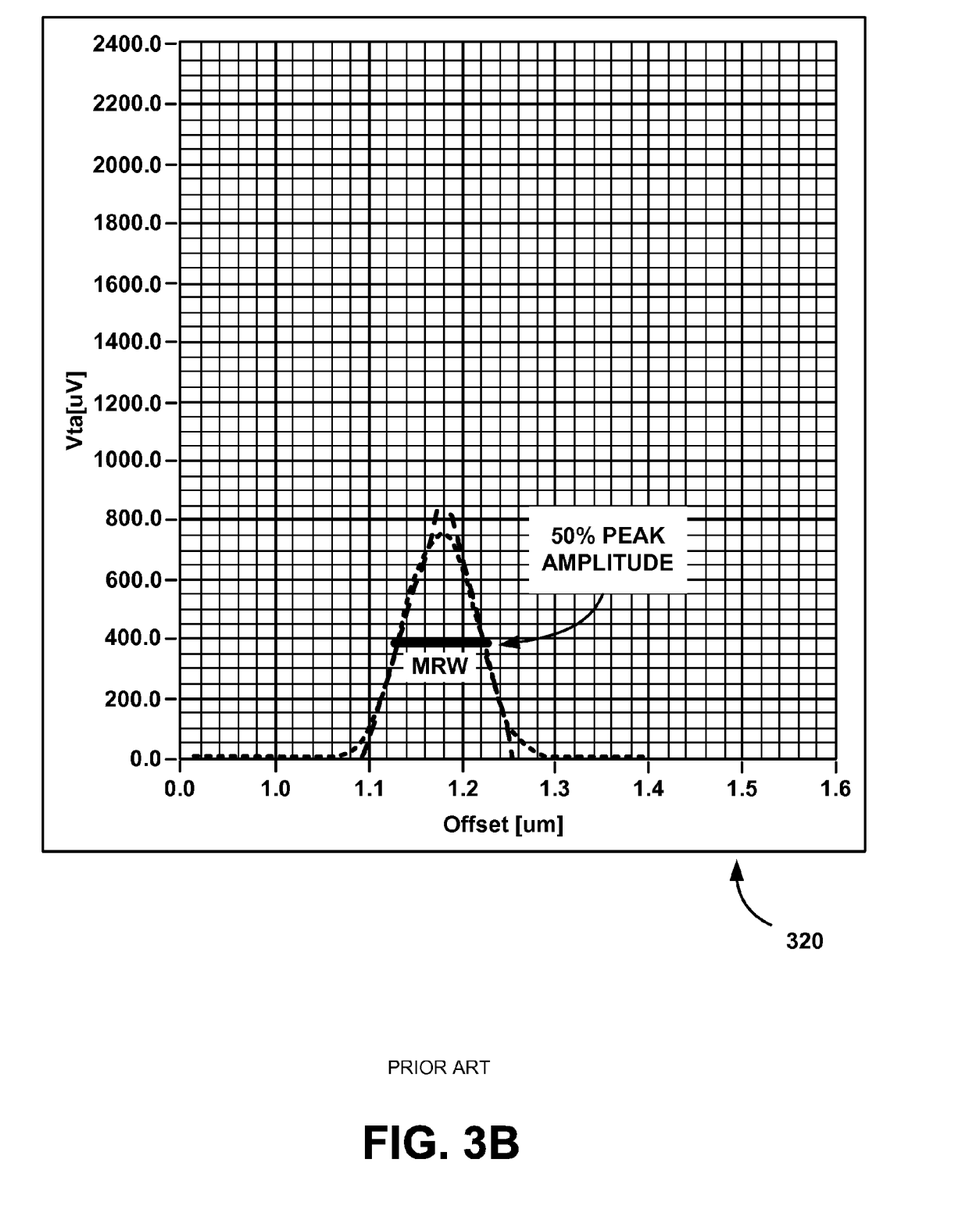
FIG. 3B is a graph illustrating a micro-track profile according to a typical triple-track test (3T) procedure.

It is typical for an HDD developer or manufacturer to characterize the performance of a magnetic read/write head in a number of ways using a number of respective head profiles. FIG. 3A is a graph illustrating a full-track profile 310, according to a typical 3T procedure. A full-track profile, such as full-track profile 310, is often used to determine the magnetic write width (MWW) of a head, whereby the MWW is measured or computed at 50% of peak amplitude of the full-track profile. FIG. 3B is a graph illustrating a micro-track profile 320, according to a typical 3T procedure. A micro-track profile, such as micro-track profile 320, is often used to determine the magnetic reader width (MRW) of a head, whereby the MRW is measured or computed at 50% of peak amplitude of the micro-track profile. With the MWW and MRW values, a total erase band associated with a particular head can be computed, for example, using a triple-track test (3T) procedure. Note that the erase bands can vary at different tracks on a disk media based in part on the skew angle of the head at the different tracks. Thus, erase bands may be computed at various locations, or tracks, on the disk.

A 3T procedure typically involves writing two data tracks at a certain distance apart and erasing a track between the two written tracks, thereby leaving three tracks to work with (thus, the moniker "triple-track"). Due to the erase bands associated with a recording head, erasing the middle track is performed to affect the written tracks, i.e., via the erase bands. Based on the three tracks, a triple-track test profile is constructed, from which a "total" erase band width corresponding to the particular head or head design is computed. The "total" erase band width refers collectively to the width of both erase bands associated with a track (e.g., the left and right sides of a track), which corresponds to the particular read/write head at the particular skew angle associated with the track.

Figure 3C:
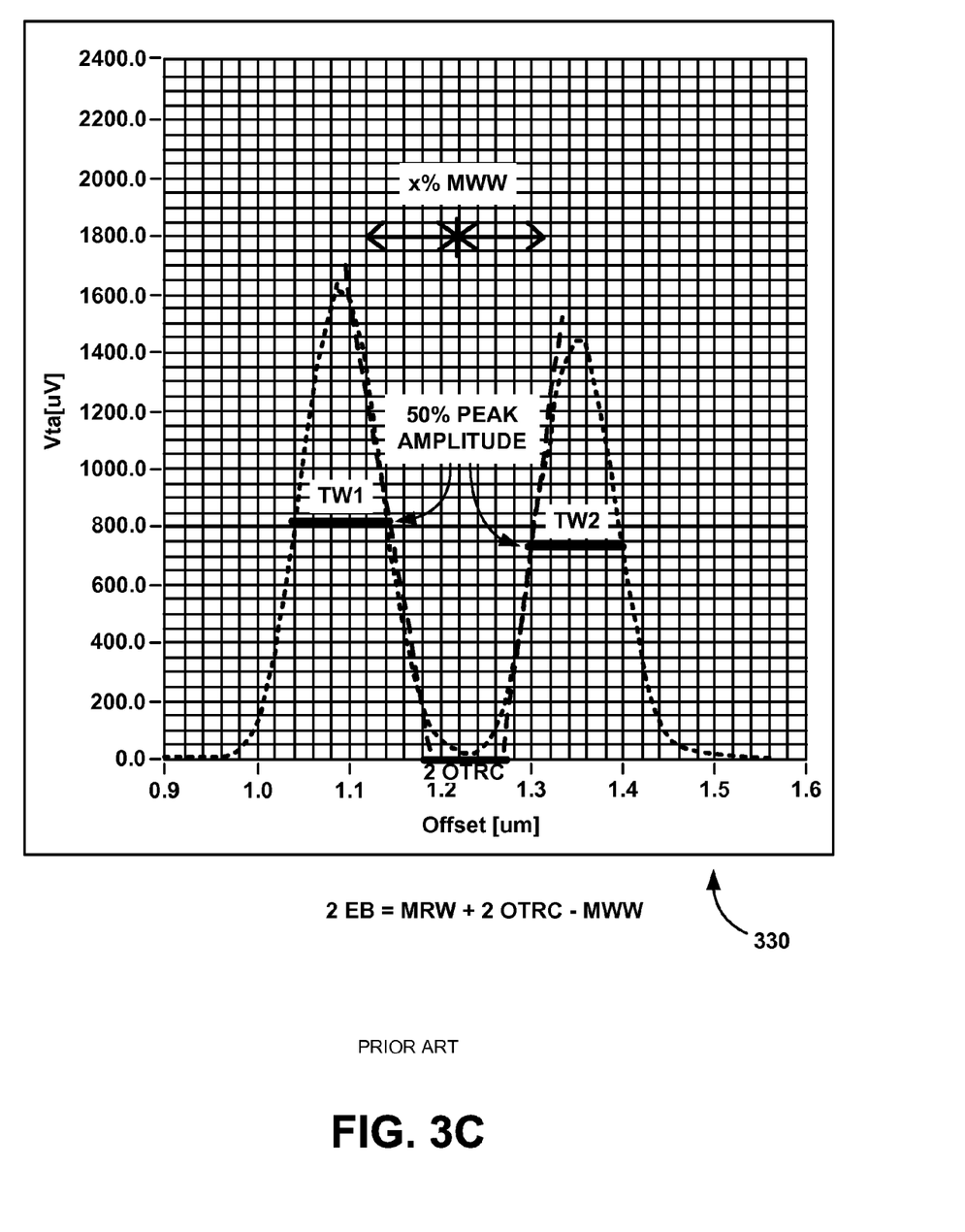
FIG. 3C is a graph illustrating a triple-track test (3T) profile according to a typical 3T procedure.

FIG. 3C is a graph illustrating a triple-track test (3T) profile 330, according to a typical 3T procedure. From the 3T profile 330, one can compute the off-track read capability (OTRC) corresponding to a head. Recall that the MWW and the MRW are typically computed for the head, e.g., using full-track and micro-track profiles, respectively. Hence, based on the OTRC, MWW, and MRW, the total erase band width (2 EB) can be computed. In reference to the example 3T profile 330, the following equation can be used to compute the total erase band width:

$$2\ EB = MRW + 2\ OTRC - MWW \qquad (1),$$

where the 2 OTRC factor is essentially computed as the width of the "valley" between the two written tracks after the effect of the middle erase track.

However, a typical 3T procedure such as the foregoing does not provide the separate erase band widths associated with the track, i.e., the left side (inner diameter) erase band width and the right side (outer diameter) erase band width.

SUMMARY OF EMBODIMENTS OF THE INVENTION

A triple track (3T) test for determining an erase band width associated with a read/write head is described. On a magnetic media, such as a hard disk, first and second data tracks are written in each direction and at a certain distance from an origin. A track having a center at the origin is erased, thereby creating an erase track between two data tracks which were modified by the erase process. A first distance is measured in one direction from the origin to one of the modified data tracks and, based on the first distance, a first erase band width is computed. For example, the distance from the origin to the left, or inner, modified data track is measured in order to compute the left erase band width based thereon. To compute the other erase band width a second distance is measured in the other direction from the origin to the other modified data track and, based on the second distance, a second erase band width is computed. For example, the distance from the origin to the right, or outer, modified data track is measured in order to compute the right erase band width based thereon.

Based on the foregoing improved 3T test, rather than computing the total erase band width, each separate erase band width associated with the track is computed, i.e., the left side (inner diameter) erase band width and the right side (outer diameter) erase band width are computed. Consequently, a more accurate characterization of head performance is obtained. A more accurate characterization of the head can benefit, for example, head development as well as head and HDD production.

A side erase amplitude loss (SEAL) measurement procedure, for determining the amount of signal amplitude lost by an adjacent track due to the respective erase bands, is also described. A side-erase profile is constructed based on a composite, or superimposition, of the 3T profile and a full-track profile. Based on the side-erase profile, amplitude losses are computed for the respective erase bands. The SEAL values can be used, for example, as a head performance characterization parameter and may also benefit the HDD servo system.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

When a recording ("write") element of a read/write head writes data to a magnetic disk media, un-magnetized areas are left along both sides of the data track. This un-magnetized area between the data tracks is referred to as "erase band." Erase band width is an important performance parameter for determining the track density of a head, especially in view of the improvements in areal density which result in very narrow data tracks. Additionally, erase band also affects the HDD servo design and performance. Therefore, it is important to characterize the erase band of a read/write head in HDD development and to measure the erase band quickly and accurately in head production.

An improved triple track (3T) test for determining an erase band width associated with a read/write head involves writing a data track in each direction from and at a certain distance from an origin or reference location. A track having a center at the origin is erased using the same head, thereby creating an erase track between two data tracks which were modified by the erase process, i.e., by the erase bands manifested by the erase operation.

According to an embodiment, a first distance is measured in one direction from the origin to one of the modified data tracks and, based on the first distance, a first erase band width is computed. For example, the distance from the origin to the left, or inner, modified data track is measured in order to compute the left erase band width based thereon. According to an embodiment, to compute the other erase band width a second distance is measured in the other direction from the origin to the other modified data track and, based on the second distance, a second erase band width is computed. For example, the distance from the origin to the right, or outer, modified data track is measured in order to compute the right erase band width based thereon.

A side erase amplitude loss (SEAL) measurement procedure, for determining the amount of signal amplitude lost by an adjacent track due to the respective erase bands, involves construction of a side-erase profile. The side-erase profile is constructed based on a superimposition of the 3T profile and a full-track profile. Based on the side-erase profile, amplitude losses are computed for the respective erase bands. The SEAL values can be used, for example, as a head performance characterization parameter and may also benefit the HDD servo system.

It should be understood by those skilled in the art that various embodiments of the invention enhance the hard disk drive development and manufacturing process by more accurately characterizing head performance.

Numerous specific embodiments are set forth in detail to provide a more thorough understanding of the present technology. The discussion of these detailed embodiments begins with an overview of a hard disk drive (HDD) and the components connected therein. The discussion then focuses on embodiments of the invention that provide an improved triple track test for determining an erase band width associated with a read/write head, and a side erase amplitude loss measurement procedure for determining the amount of signal amplitude lost by an adjacent track due to the respective erase bands.

Although embodiments of the present invention are described in conjunction with a magnetic read/write head in a hard disk drive, it is understood that the embodiments described herein are useful outside of the art of HDD design, manufacturing and operation. The utilization of the HDD magnetic read/write head example is only one embodiment and is provided herein merely for purposes of brevity and clarity.

Hard Disk Drive (HDD) Configuration

Figure 1:
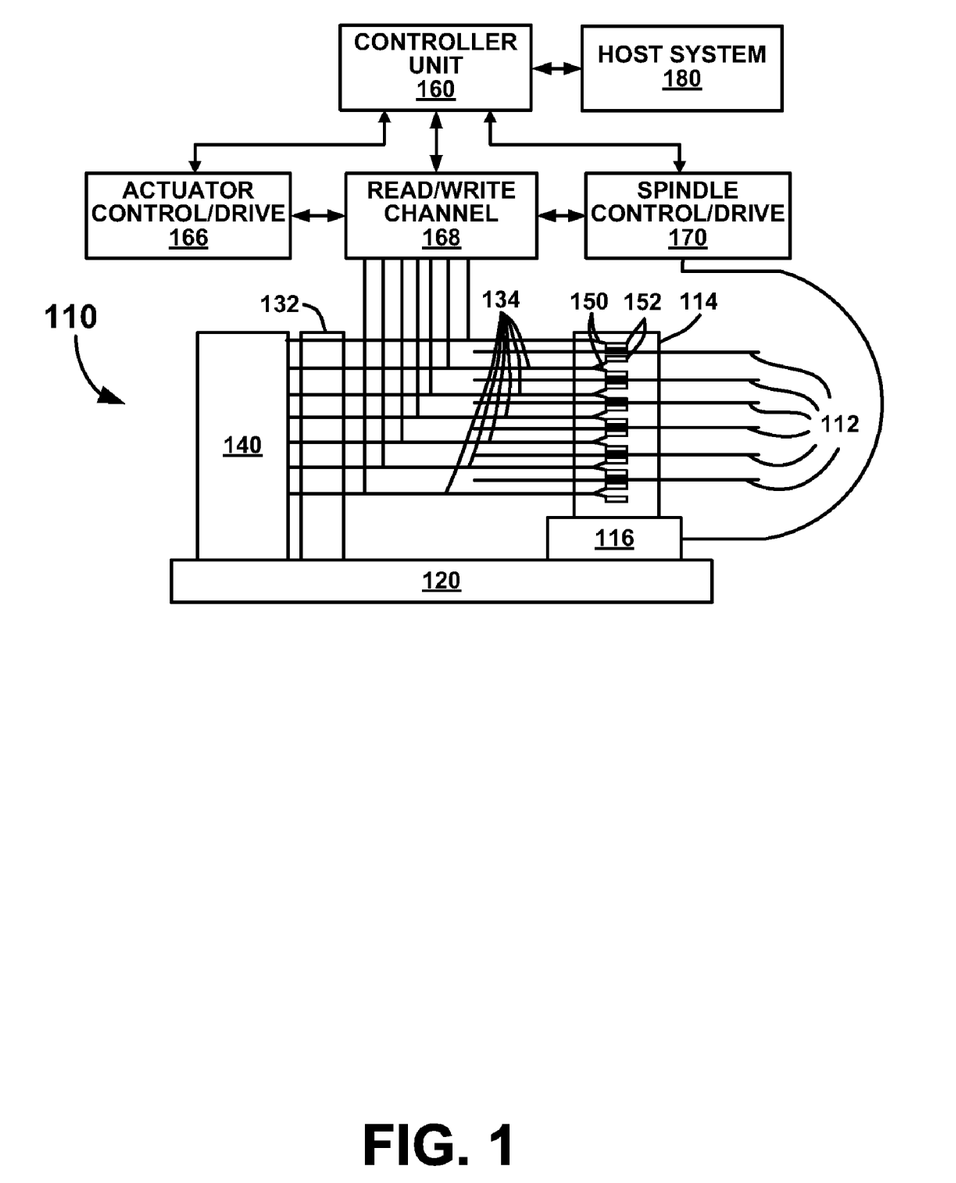
FIG. 1 illustrates a side view of a disk drive system, according to an embodiment of the invention.
Figure 2:
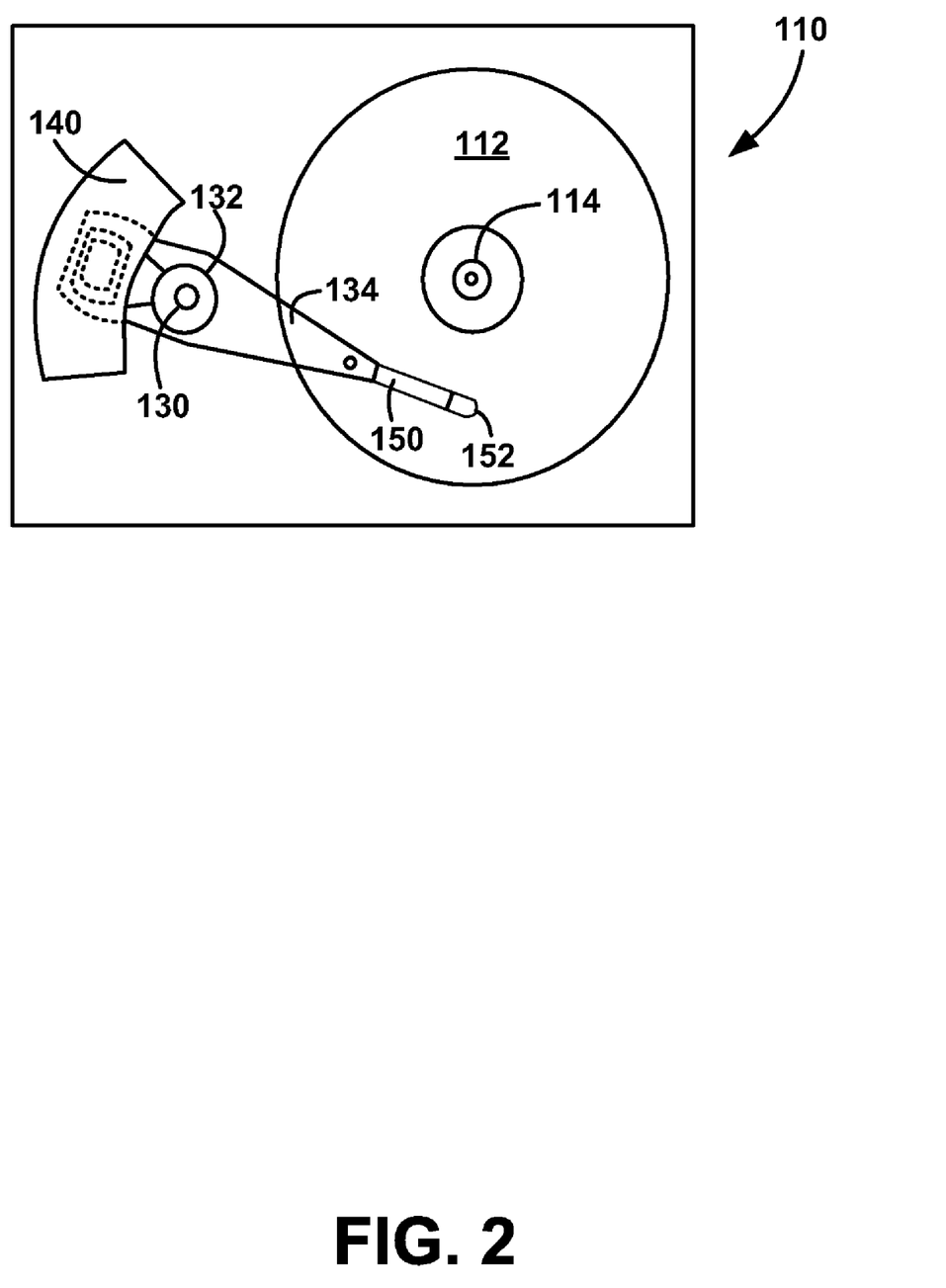
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry and executable instructions, although it should be apparent that one skilled in the computer arts could also enable these aspects as firmware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Improved Triple-Track Test for Erase Band Width Measurements

Figure 4:
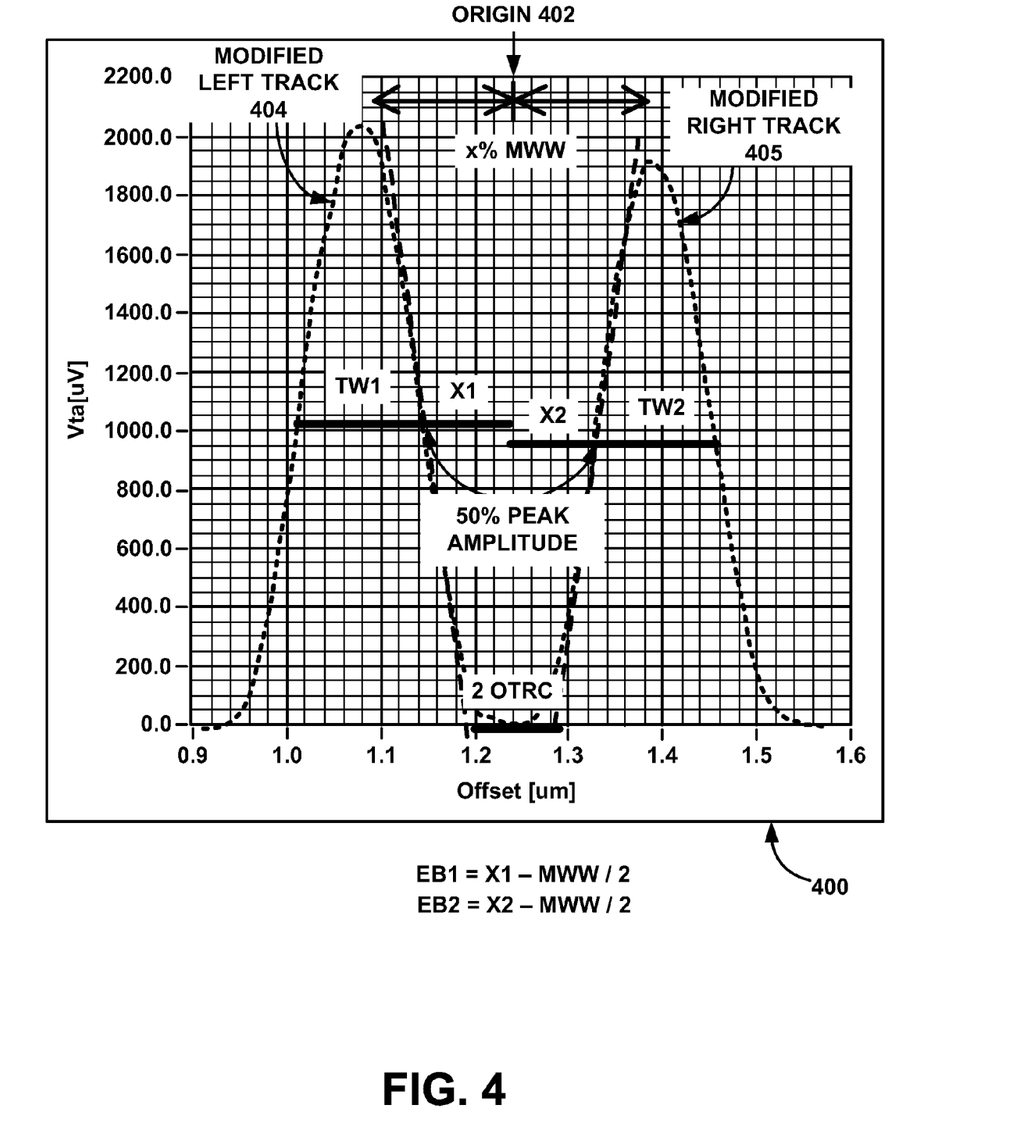
FIG. 4 is a graph illustrating an improved triple-track test (3T) profile for measuring and/or computing the left erase band width and the right erase band width, according to an embodiment of the invention.

FIG. 4 is a graph illustrating an improved triple-track test (3T) profile 400 for measuring and computing the left erase band width and the right erase band width, according to an embodiment of the invention. From the 3T profile 400, one can compute the distance X1 and the distance X2 between the erase track center (i.e., the point of origin 402) and the "modified left track" 404 and the "modified right track" 405, respectively. The "modified left track" refers to the inner data track written as part of the 3T procedure, adjacent to which an erase track is subsequently written, which is modified by the writing of the erase track. The "modified right track" refers to the outer data track written as part of the 3T procedure, adjacent to which the erase track is subsequently written, which is modified by the writing of the erase track.

Recall that the MWW and the MRW are typically computed for the head, e.g., using full-track and micro-track profiles, such as full-track profile 310 of FIG. 3A and micro-track profile 320 of FIG. 3B, respectively. Hence, based on X1 and MWW, the left erase band width (EB1) can be computed, and based on X2 and MWW, the right erase band width (EB2) can be computed. Neither of the foregoing computations need rely upon the off-track read capability (OTRC) corresponding to a head.

In reference to the example 3T profile 400, the following equations can be used to compute the left erase band width EB1 and the right erase band width EB2:

$$EB1 = X1 - MWW/2 \quad (2);$$

$$EB2 = X2 - MWW/2 \quad (3).$$

Recall that with a 3T test, the first and second data tracks are written at a certain distance apart, which may be characterized as a certain distance from the origin. According to an embodiment, the first and second data tracks are each written with a track centerline at x % of MWW from the origin, in the left and right directions, respectively, where x is slightly less than 100. One reason for constraining x in this manner is to ensure that both the first and the second data tracks are well wider than MRW. Typically, MRW is about 60-80% of MWW. Thus, constraining x to slightly less than 100% MWW ensures the desired relative widths of the first and second data tracks.

Figure 5:
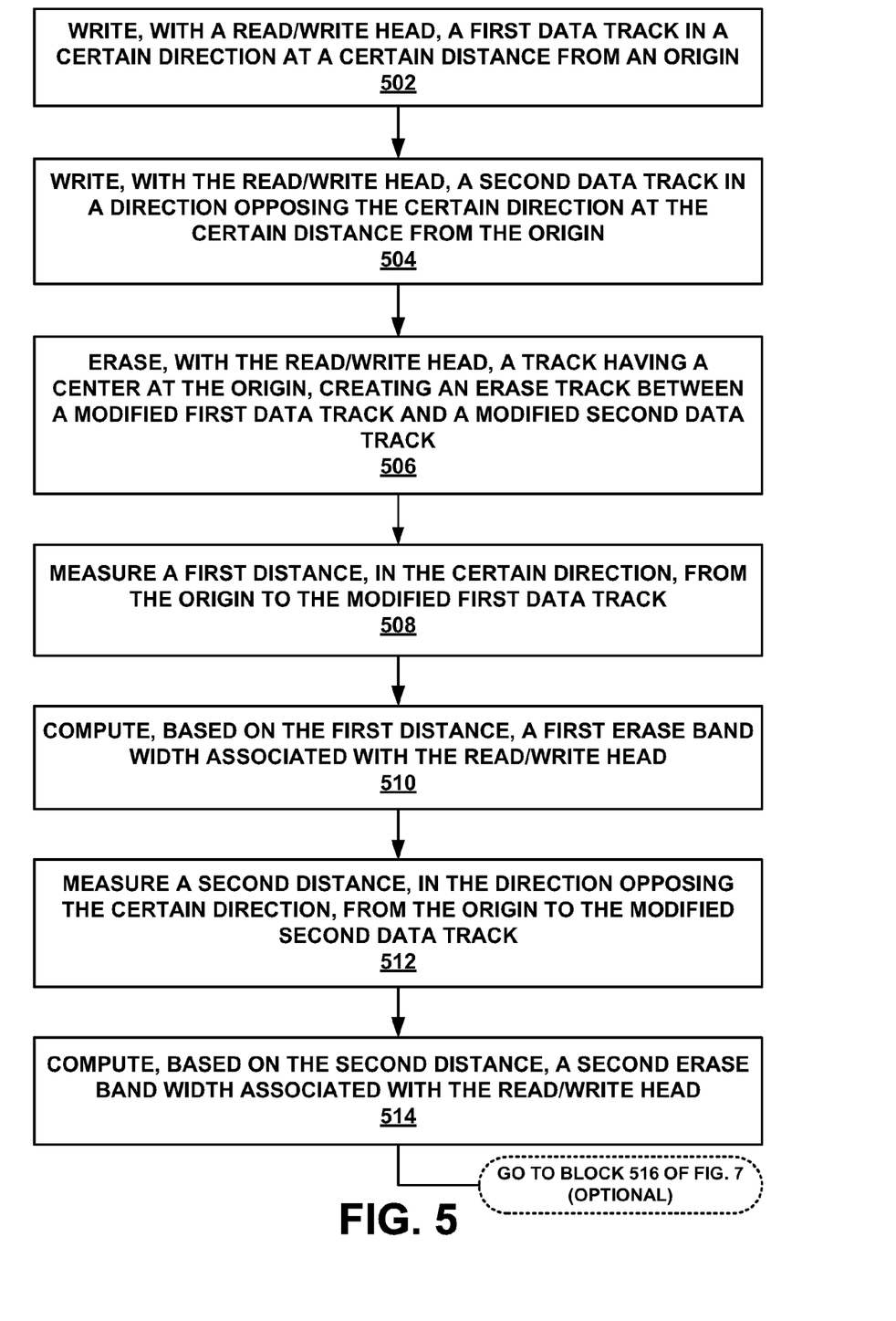
FIG. 5 is a flow diagram illustrating a method for determining an erase band width associated with a read/write head, according to an embodiment of the invention.

FIG. 5 is a flow diagram illustrating a method for determining an erase band width associated with a read/write head, according to an embodiment of the invention.

At block 502, a first data track is written in a certain direction at a certain distance from an origin. For example, a track is written at x % MWW from the origin 402 (FIG. 4) in the direction toward the inner diameter of the media (e.g., to the left of the origin 402 in FIG. 4), such as a magnetic disk.

At block 504, a second data track is written in a direction opposing the certain direction at the certain distance from the origin. For example, a track is written at x % MWW from the origin 402 (FIG. 4) in the direction toward the outer diameter of the media (e.g., to the right of the origin 402 in FIG. 4). At block 506, a track having its centerline at the origin is erased, creating an erase track between a modified first data track (e.g., as represented by the modified left track 404 of FIG. 4) and a modified second data track (e.g., as represented by the modified right track 405 of FIG. 4). For example, a track is written at x % MWW from the origin 402 (FIG. 4) in the direction toward the inner diameter of the media (e.g., to the left of the origin 402 in FIG. 4). Blocks 502, 504, 506 are each performed using the same read/write head, i.e., the head for which the erase band widths are being characterized.

At block 508, a first distance is measured in the certain direction (see block 502) from the origin to the modified first data track. For example, the distance X1 (FIG. 4) is measured, such as by measurement of and/or computation based on a read signal corresponding to the 3T profile 400 for the head.

At block 510, a first erase band width associated with the head is computed based on the first distance measured at block 508. For example, the left erase band width, EB1, is computed as the difference of the first distance and one-half the magnetic write width (MWW) corresponding to the head. Implementation of the method for determining an erase band width associated with a read/write head may terminate at this point, thereby yielding one of the two erase band widths. However, knowing both erase band widths separately and accurately is valuable in many instances, such as to more accurately characterize the performance of the corresponding head. Hence, according to an embodiment, the method continues to optional blocks 512, 514.

At block 512, a second distance is measured in the direction opposing the certain direction from the origin to the modified second data track. For example, the distance X2 (FIG. 4) is measured, such as by measurement of and/or computation based on a read signal corresponding to the 3T profile 400 for the head.

At block 514, a second erase band width associated with the head is computed based on the second distance measured at block 512. For example, the right erase band width, EB2, is computed as the difference of the second distance and one-half the magnetic write width (MWW) corresponding to the head.

According to an embodiment, the first and second distances are measured and/or computed from the origin to a location on the respective modified data tracks corresponding to fifty percent of peak amplitude of a signal corresponding to the respective modified data tracks. For example, attention is directed to the "50% PEAK AMPLITUDE" locations depicted in the 3T profile 400 of FIG. 4, which correspond to the locations on the respective modified data tracks at which the respective distances X1 and X2 are measured from the origin.

According to an embodiment, the foregoing "erase band width measurement" method is embodied in computer code, e.g., computer software or firmware. That is, the erase band width measurement method may be implemented in a computer-readable medium storing sequences of instructions which, when executed by a processor, command and/or compute the actions corresponding to blocks 502-514 of FIG. 5. For example, such instructions may be executable by a processor constituent to a general purpose computer or a special purpose computer programmed to perform the disclosed embodiment, such as a magnetic read/write head testing instrument.

Side Erase Amplitude Loss Measurements

A side erase amplitude loss (SEAL) measurement procedure, for determining the amount of signal amplitude lost by an adjacent track due to the respective erase bands, involves construction of a "side-erase profile." The side-erase profile is constructed based on a superimposition of the 3T profile (e.g., the 3T profile 400 of FIG. 4) and a full-track profile (e.g., the full-track profile 310 of FIG. 3A). For example, a side-erase profile may be constructed by mathematically superimposing a full-track profile with a 3T profile. Based on the side-erase profile, amplitude losses are computed for the respective erase bands.

Figure 6:
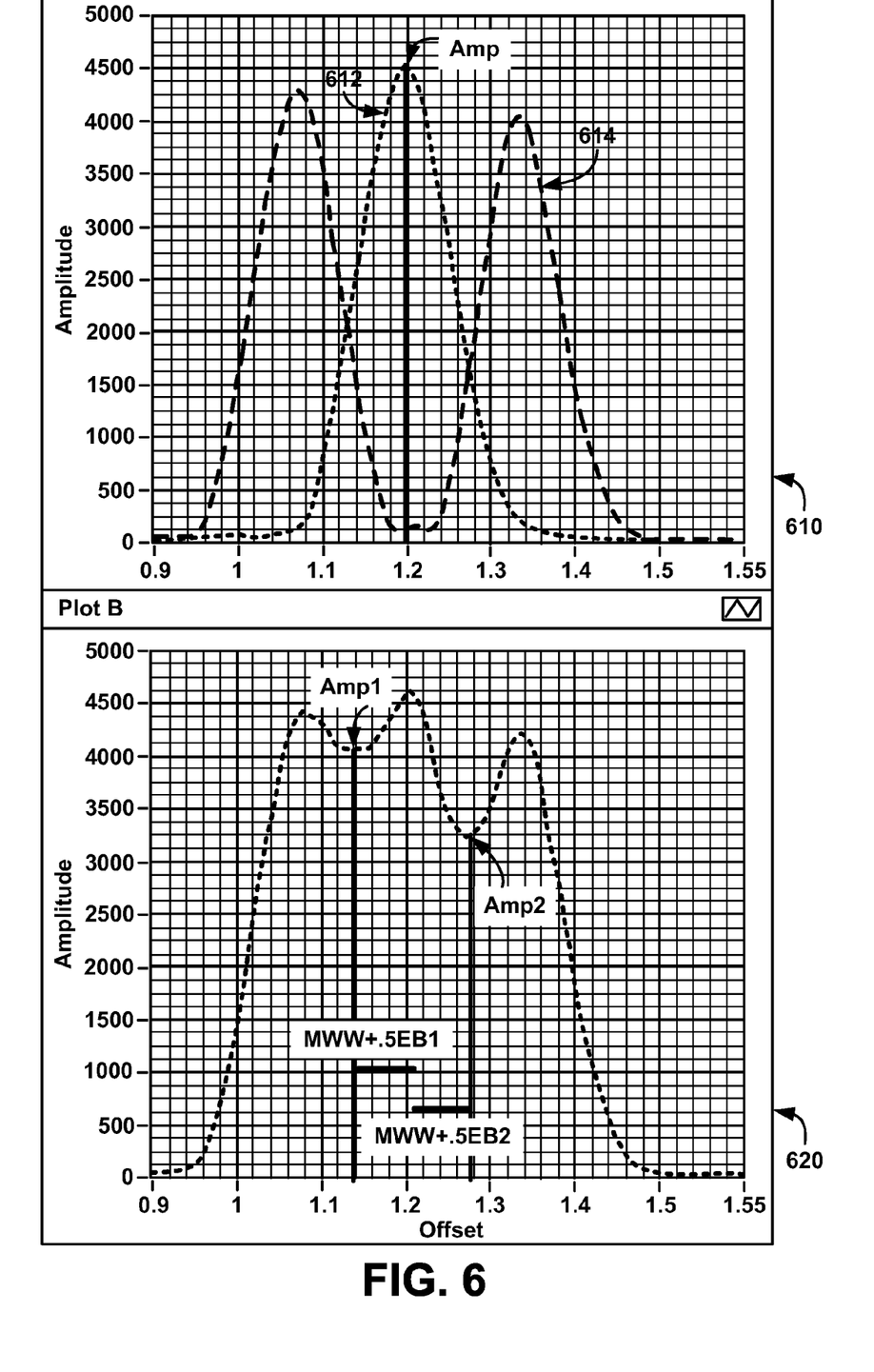
FIG. 6 is a graph illustrating a superimposition and a side-erase profile for measuring and computing side erase amplitude loss, according to an embodiment of the invention.

FIG. 6 is a graph illustrating a superimposition 610 and a side-erase profile 620 for measuring and computing side erase amplitude loss, according to an embodiment of the invention. The superimposition 610 illustrates an example of superimposing a full-track profile 612 with a 3T profile 614. The side-erase profile 620 illustrates an example of a side-erase profile constructed based on the superimposition of full-track profile 612 with a 3T profile 614. Using a side-erase profile or a mathematical equivalent thereof, such as side-erase profile 620, side erase amplitude losses associated with the respective erase bands are computable therefrom.

Figure 7:
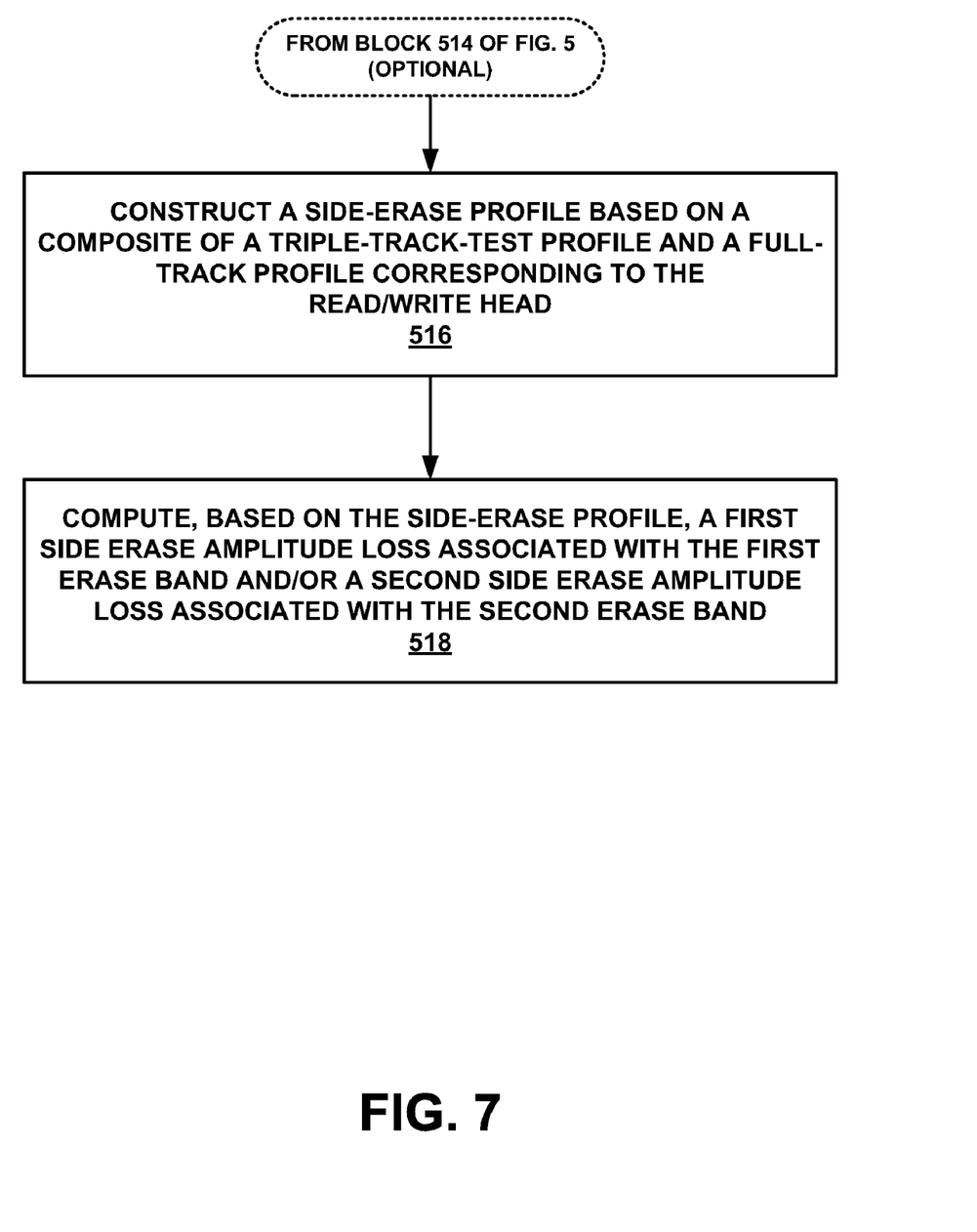
FIG. 7 is a flow diagram illustrating a method for determining a data track amplitude loss associated with an erase band associated with a read/write head, according to an embodiment of the invention.
Figure 8:
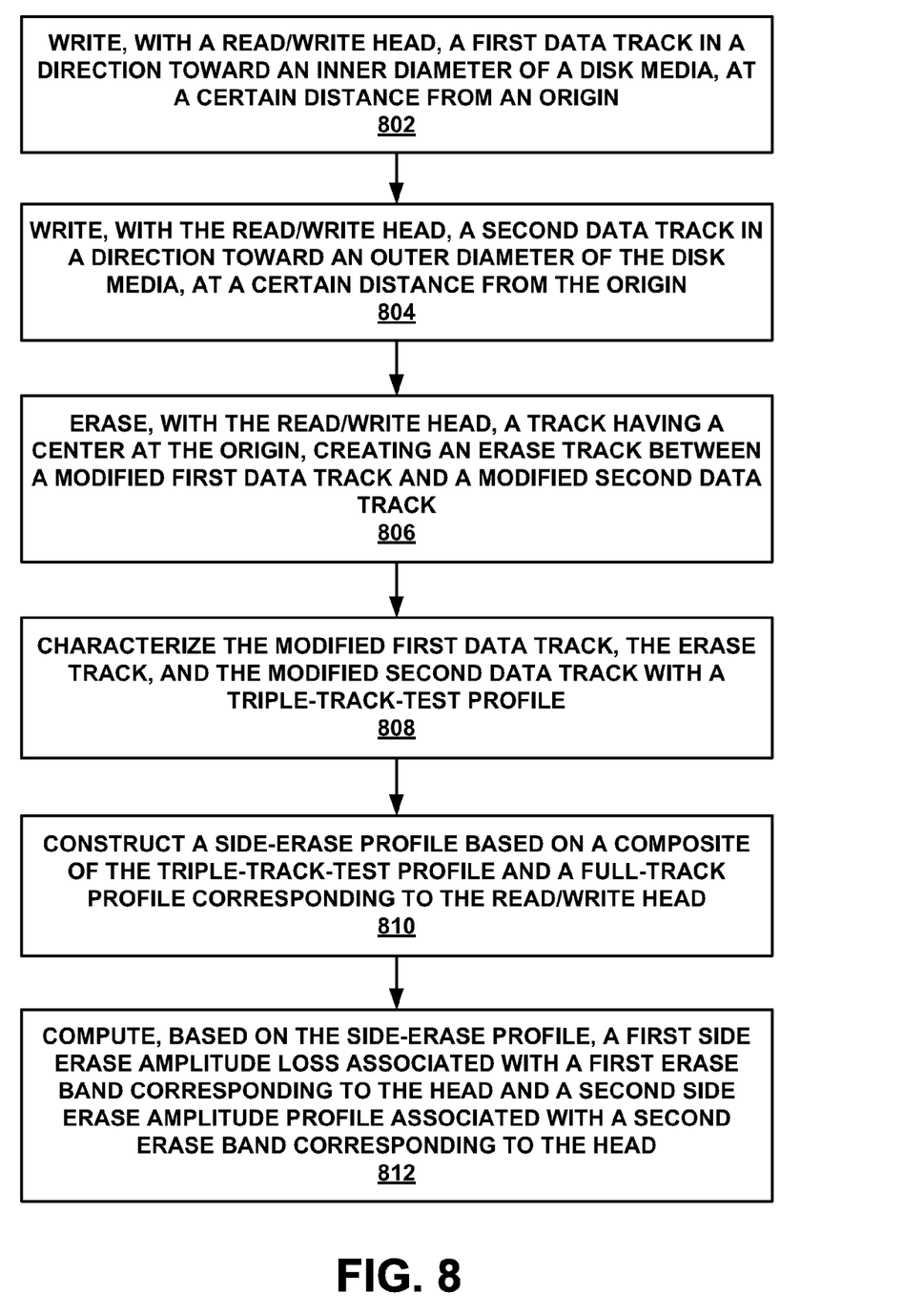
FIG. 8 is a flow diagram illustrating a method for determining a data track amplitude loss associated with an erase band associated with a read/write head, according to an embodiment of the invention.

FIG. 7 is a flow diagram illustrating a method for determining a data track amplitude loss associated with an erase band associated with a read/write head, according to an embodiment of the invention. FIG. 8 is a flow diagram illustrating a method for determining a data track amplitude loss associated with an erase band associated with a read/write head, according to an embodiment of the invention. The methods of FIGS. 7 and 8 are based on the concept that a data track amplitude when a read/write head writes to (or erases) a track adjacent to the data track. The manner in which the method for determining a data track amplitude loss associated with an erase band associated with a read/write head is practiced may vary from implementation to implementation. For example, the method of FIG. 7 may be implemented as a continuation of the method for determining an erase band width associated with a read/write head of FIG. 5. Alternatively, the method of FIG. 8 may be implemented as a method independent of the method of FIG. 5, in which case, for example, some other method may be used for determining the respective erase band widths associated with the read/write head.

With reference to FIG. 7, which is depicted as a continuation of the method illustrated in FIG. 5, the modified first data track, the erase track, and the modified second data track are characterized in a triple-track-test (3T) profile. At block 516 a side-erase profile is constructed based on a composite of the 3T profile and a full-track profile corresponding to the read/write head. Side-erase profile 620 is an example of a side-erase profile which can be used in the method of FIG. 7, which could be constructed from profiles generally illustrated by example full-track profile 310 of FIG. 3A and example 3T profile 400 of FIG. 4.

At block 518, based on the side-erase profile constructed at block 516, a first side erase amplitude loss associated with the first erase band and a second side erase amplitude loss associated with the second erase band are computed and/or measured. According to an embodiment, computing the first side erase amplitude loss comprises measuring a first amplitude of the side-erase profile at a distance, from the origin and in the certain direction, equivalent to the sum of one-half the first erase band width (EB1) and a magnetic write width (MWW) corresponding to the read/write head. Similarly, computing the second side erase amplitude loss comprises measuring a second amplitude of the side-erase profile at a distance, from the origin and in the direction opposing the certain direction, equivalent to the sum of one-half the second erase band width (EB2) and the MWW corresponding to the read/write head.

In reference to the example side-erase profile 620 of FIG. 6, the following equations can be used to compute the left side erase amplitude loss (SEAL1) associated with the first (left) erase band width EB1 and the right side erase amplitude loss (SEAL2) associated with the second (right) erase band width EB2:

$$SEAL1 = Amp1/Amp * 100\% \quad (4);$$

$$SEAL2 = Amp2/Amp * 100\% \quad (5),$$

where Amp1 and Amp2 represent the first amplitude and second amplitude, respectively, computed from the side-erase profile, and Amp represents the peak amplitude of the full-track profile based on which the side-erase profile is constructed. Hence, the smaller the SEAL value, the more amplitude loss is characterized. However, if an implementation is desired in which a higher SEAL value characterizes more amplitude loss, equations (4), (5) could be readily modified to the following equations:

$$SEAL1 = 1 - (Amp1/Amp * 100\%) \quad (6);$$

$$SEAL2 = 1 - (Amp2/Amp * 100\%) \quad (7).$$

With reference to the method of FIG. 8, which may be implemented as a method independent of the method of FIG. 5, at block 802 a first data track is written in a direction toward the inner diameter of a disk medium at a certain distance from an origin. At block 804, a second data track is written in a direction toward the outer diameter of the disk media at the certain distance from the origin. At block 806, a track having its centerline at the origin is erased, creating an erase track between a modified first data track and a modified second data track. Blocks 502, 504, 506 are each performed using the same read/write head.

At block 808, the modified first data track, the erase track, and the modified second data track are characterized with a triple-track-test (3T) profile. For an example of a 3T profile, refer to 3T profile 400 of FIG. 4. At block 810, a side-erase profile is constructed based on a composite of the 3T profile constructed at block 808 and a full-track profile corresponding to the read/write head. For an example of a side-erase profile, refer to side-erase profile 620 of FIG. 6.

At block 812, based on the side-erase profile constructed at block 810, a first SEAL associated with a first erase band associated with the head and a second SEAL associated with a second erase band associated with the head are computed. For example, the side erase amplitude losses are computed based on equations (4) and (5) or equations (6) and (7), with reference to a side-erase profile such as example side-erase profile 620 of FIG. 6.

According to an embodiment, the foregoing "SEAL measurement" methods are embodied in computer code, e.g., computer software or firmware. That is, the side erase amplitude loss measurement methods may be implemented in a computer-readable medium storing sequences of instructions which, when executed by a processor, command and/or compute the actions corresponding to blocks 516, 518 of FIG. 7 and/or blocks 802-812 of FIG. 8. For example, such instructions may be executable by a processor constituent to a general purpose computer or a special purpose computer programmed to perform the disclosed embodiment, such as a magnetic read/write head testing instrument.

It should be understood that although various embodiments of the present invention are described in the context of a data recovery procedure in a hard disk drive (HDD), the foregoing embodiments are merely exemplary of various implementations of principles of the present technology. Therefore, it should be understood that various embodiments of the invention described herein may apply to any devices, configurations, or systems in which magnetic read/write heads are employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of determining an erase band width associated with a magnetic read/write head, the method comprising:
    writing a first data track in a certain direction at a certain distance from an origin;
    writing a second data track in a direction opposing said certain direction at said certain distance from said origin;
    erasing a track having a center at said origin, creating an erase track between a modified first data track and a modified second data track;
    measuring a first distance, in said certain direction, from said origin to said modified first data track; and
    computing, based on said first distance, a first erase band width associated with said read/write head.

2. The method recited in claim 1, further comprising:
    measuring a second distance, in said direction opposing said certain direction, from said origin to said modified second data track; and
    computing, based on said second distance, a second erase band width associated with said read/write head.

3. The method recited in claim 2:
    wherein computing said first erase band comprises computing the difference of said first distance and one-half a magnetic write width corresponding to said read/write head; and
    wherein computing said second erase band comprises computing the difference of said second distance and one-half said magnetic write width corresponding to said read/write head.

4. The method recited in claim 2:
    wherein measuring a first distance comprises measuring from said origin across said modified first data track to a location corresponding to 50 percent of peak amplitude of a signal corresponding to said modified first data track; and
    wherein measuring a second distance comprises measuring from said origin across said modified second data track to a location corresponding to 50 percent of peak amplitude of a signal corresponding to said modified second data track.

5. The method recited in claim 2, wherein said modified first data track, said erase track, and said modified second data track are characterized in a triple-track-test (3T) profile, the method further comprising:
    constructing a side-erase profile based on a composite of said triple-track-test profile and a full-track profile corresponding to said read/write head; and
    computing, based on said side-erase profile, a first side erase amplitude loss associated with said first erase band and a second side erase amplitude loss associated with said second erase band.

6. The method recited in claim 5:
    wherein computing a first side erase amplitude loss comprises measuring a first amplitude of said side-erase profile at a distance, from said origin in said certain direction, equivalent to the sum of one half said first erase band width and a magnetic write width corresponding to said read/write head; and
    wherein computing a second side erase amplitude loss comprises measuring a second amplitude of said side-erase profile at a distance, from said origin in said direction opposing said certain direction, equivalent to the sum of one half said second erase band width and said magnetic write width corresponding to said read/write head.

7. The method recited in claim 6:
    wherein computing a first side erase amplitude loss comprises computing the quotient of said first amplitude of said side-erase profile and a peak amplitude of said full-track profile corresponding to said read/write head; and
    wherein computing a second side erase amplitude loss comprises computing the quotient of said second amplitude of said side-erase profile and said peak amplitude of said full-track profile corresponding to said read/write head.

8. The method recited in claim 1, wherein said certain distance is based on a percentage of a magnetic write width corresponding to said read/write head, and wherein said percentage is in a range of 90 percent to 100 percent.

9. A method for determining a data track amplitude loss associated with an erase band associated with a magnetic read/write head, wherein a data track loses amplitude when said read/write head writes to or erases a track adjacent to said data track, the method comprising:
  writing a first data track, in a direction toward an inner diameter of a disk media, at a certain distance from an origin;
  writing a second data track, in a direction toward an outer diameter of said disk media, at a certain distance from said origin;
  erasing a track having a center at said origin, creating an erase track between a modified first data track and a modified second data track;
  characterizing said modified first data track, said erase track, and said modified second data track with a triple-track-test (3T) profile;
  constructing a side-erase profile based on a composite of said triple-track-test profile and a full-track profile corresponding to said read/write head; and
  computing, based on said side-erase profile, a first side erase amplitude loss associated with a first erase band corresponding to said read/write head and a second side erase amplitude loss associated with a second erase band corresponding to said read/write head.

10. The method recited in claim 9:
  wherein computing a first side erase amplitude loss comprises measuring a first amplitude of said side-erase profile at a distance, from said origin in said direction toward said inner diameter, equivalent to the sum of one half said first erase band width and a magnetic write width corresponding to said read/write head; and
  wherein computing a second side erase amplitude loss comprises measuring a second amplitude of said side-erase profile at a distance, from said origin in said direction toward said outer diameter, equivalent to the sum of one half said second erase band width and said magnetic write width corresponding to said read/write head.

11. The method recited in claim 10:
  wherein computing a first side erase amplitude loss comprises computing the quotient of said first amplitude of said side-erase profile and a peak amplitude of said full-track profile corresponding to said read/write head; and
  wherein computing a second side erase amplitude loss comprises computing the quotient of said second amplitude of said side-erase profile and said peak amplitude of said full-track profile corresponding to said read/write head.

12. A non-transitory computer-readable medium storing one or more sequences of instructions for determining an erase band width associated with a magnetic read/write head, said instructions which, when executed by one or more processors, cause performance of:
  writing a first data track in a certain direction at a certain distance from an origin;
  writing a second data track in a direction opposing said certain direction at said certain distance from said origin;
  erasing a track having a center at said origin, creating an erase track between a modified first data track and a modified second data track;
  measuring a first distance, in said certain direction, from said origin to said modified first data track;
  computing, based on said first distance, a first erase band width associated with said read/write head;
  measuring a second distance, in said direction opposing said certain direction, from said origin to said modified second data track; and
  computing, based on said second distance, a second erase band width associated with said read/write head.

13. The computer-readable medium recited in claim 12:
  wherein computing said first erase band comprises computing the difference of said first distance and one-half a magnetic write width corresponding to said read/write head; and
  wherein computing said second erase band comprises computing the difference of said second distance and one-half said magnetic write width corresponding to said read/write head.

14. The computer-readable medium recited in claim 12:
  wherein measuring a first distance comprises measuring from said origin across said modified first data track to a location corresponding to 50 percent of peak amplitude of a signal corresponding to said modified first data track; and
  wherein measuring a second distance comprises measuring from said origin across said modified second data track to a location corresponding to 50 percent of peak amplitude of a signal corresponding to said modified second data track.

15. The computer-readable medium recited in claim 12, wherein said instructions cause performance of:
  characterizing said modified first data track and said modified second data track with a triple-track-test (3T) profile;
  constructing a side-erase profile based on a composite of said triple-track-test profile and a full-track profile corresponding to said read/write head; and
  computing, based on said side-erase profile, a first side erase amplitude loss associated with said first erase band and a second side erase amplitude loss associated with said second erase band.

16. The computer-readable medium recited in claim 15:
  wherein computing said first side erase amplitude loss comprising measuring a first amplitude of said side-erase profile at a distance, from said origin in said certain direction, equivalent to the sum of one half said first erase band width and a magnetic write width corresponding to said read/write head; and
  wherein computing said second side erase amplitude loss comprising measuring a second amplitude of said side-erase profile at a distance, from said origin in said direction opposing said certain direction, equivalent to the sum of one half said second erase band width and said magnetic write width corresponding to said read/write head.

17. The computer-readable medium recited in claim 16:
  wherein computing a first side erase amplitude loss comprises computing the quotient of said first amplitude of said side-erase profile and a peak amplitude of said full-track profile corresponding to said read/write head; and
  wherein computing a second side erase amplitude loss comprises computing the quotient of said second amplitude of said side-erase profile and said peak amplitude of said full-track profile corresponding to said read/write head.

* * * * *